(12) United States Patent
Wycech

(10) Patent No.: US 9,011,749 B2
(45) Date of Patent: Apr. 21, 2015

(54) BIODEGRADABLE COMPONENT, TOOLING AND PROCESS

(71) Applicant: Joseph Wycech, Grosse Pointe Shores, MI (US)

(72) Inventor: Joseph Wycech, Grosse Pointe Shores, MI (US)

( * ) Notice: Subject to any disclaimer, the term of this patent is extended or adjusted under 35 U.S.C. 154(b) by 160 days.

(21) Appl. No.: 13/710,807

(22) Filed: Dec. 11, 2012

(65) Prior Publication Data

US 2013/0177724 A1 Jul. 11, 2013

Related U.S. Application Data

(60) Provisional application No. 61/569,562, filed on Dec. 12, 2011.

(51) Int. Cl.
| | | |
|---|---|---|
| *B29C 43/18* | (2006.01) | |
| *B29C 70/68* | (2006.01) | |
| *B29C 33/00* | (2006.01) | |
| *B29C 70/84* | (2006.01) | |
| *B29C 33/76* | (2006.01) | |
| B29C 53/04 | (2006.01) | |
| B29C 33/12 | (2006.01) | |

(52) U.S. Cl.
CPC ............... *B29C 43/18* (2013.01); *B29C 53/04* (2013.01); *B29C 70/68* (2013.01); B29C 2043/189 (2013.01); B29C 2043/181 (2013.01); B29C 33/0033 (2013.01); B29C 70/84 (2013.01); B29K 2003/00 (2013.01); B29C 33/12 (2013.01); *B29C 33/76* (2013.01)

(58) Field of Classification Search
USPC .............................. 264/271.1, 275, 320, 321
See application file for complete search history.

(56) References Cited

U.S. PATENT DOCUMENTS

| | | | | |
|---|---|---|---|---|
| 3,778,496 A | * | 12/1973 | Ladd | ............................ 264/162 |
| RE28,826 E | | 5/1976 | Ladney, Jr. | |
| 4,735,761 A | | 4/1988 | Lindenberger | |
| 4,885,317 A | | 12/1989 | Thein et al. | |
| 5,965,080 A | | 10/1999 | Ando et al. | |
| 6,136,255 A | | 10/2000 | Ando et al. | |
| 6,440,354 B1 | | 8/2002 | Takai et al. | |
| 6,517,761 B2 | * | 2/2003 | Yoshida et al. | ................ 264/274 |
| 7,332,214 B2 | | 2/2008 | Ozasa et al. | |
| 8,043,539 B2 | | 10/2011 | Ozasa et al. | |
| 2003/0107145 A1 | | 6/2003 | Ozasa et al. | |
| 2005/0235445 A1 | * | 10/2005 | Wycech | ..................... 15/104.93 |

* cited by examiner

*Primary Examiner* — Atul P. Khare
(74) *Attorney, Agent, or Firm* — Carlson, Gaskey & Olds, P.C.

(57) ABSTRACT

An example tooling system for processing a workpiece includes a base, disposed about an axis. A press is axially aligned with the base. The press defines a pressing surface. A mandrel extends along the axis from the base toward the press. The mandrel is disposed at least partially in a first cavity defined by one of the base or the press. The first cavity defines a profile different from the workpiece and is arranged to receive the workpiece. The mandrel is arranged to be inserted into at least one pocket in the workpiece.

13 Claims, 11 Drawing Sheets

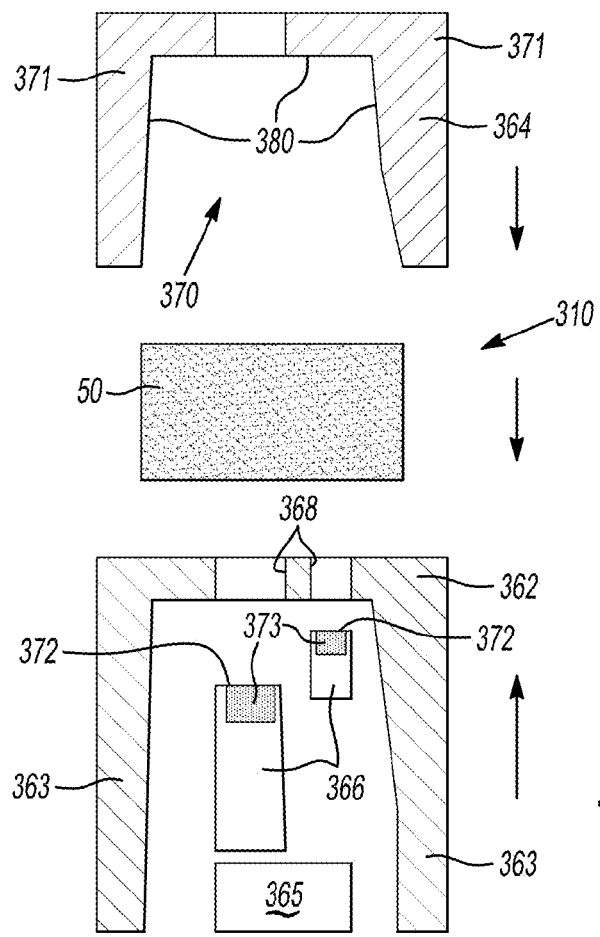
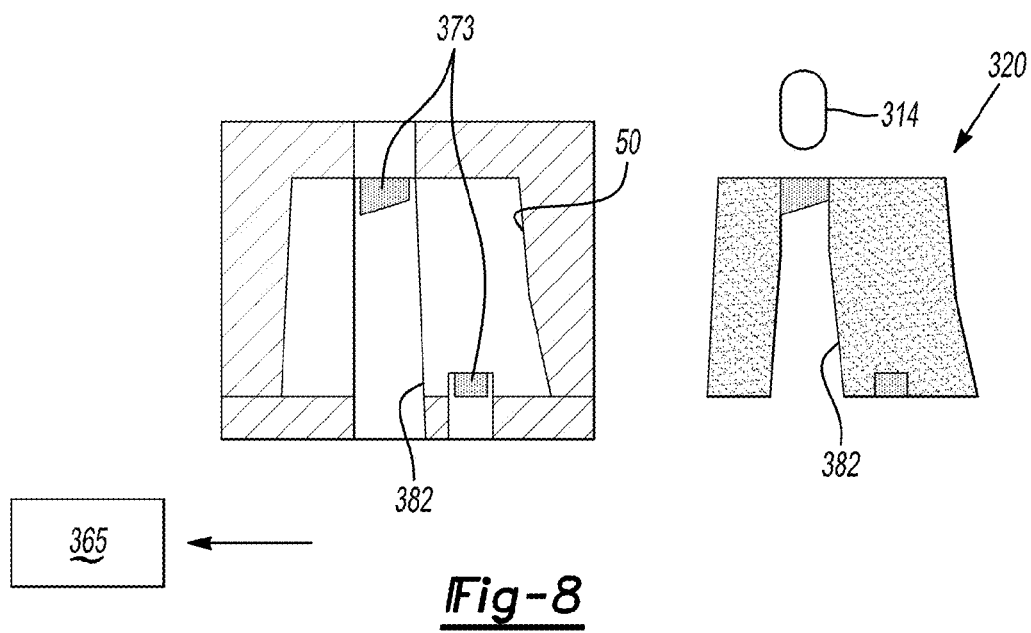

BIODEGRADABLE COMPONENT, TOOLING AND PROCESS

This application claims priority to U.S. Provisional Application No. 61/569,562 which was filed on Dec. 12, 2011.

BACKGROUND

This disclosure relates to biodegradable components, and more particularly to starch-based biodegradable components, tooling and processes therefor.

Polystyrene foam is known and used as a packaging material for shipping, household items, cars, and other areas of manufacture and transportation. For instance, polystyrene foam materials are used to prevent damage to manufactured items during transportation, as well as adding stability to packaging during the shipping process.

SUMMARY

An example tooling system for processing a workpiece includes a base disposed about an axis. A press is axially aligned with the base. The press defines a pressing surface. A mandrel extends along the axis from the base toward the press. The mandrel is disposed at least partially in a first cavity defined by one of the base and the press. The first cavity defines a profile different from the workpiece and is arranged to receive the workpiece. The mandrel is arranged to be inserted into at least one pocket in the workpiece.

An example method for processing a workpiece using a tooling system includes providing a tooling system including a base disposed about an axis. A press is axially aligned with the base. The press defines a pressing surface. A mandrel extends along the axis from the base toward the press. The mandrel is disposed at least partially in a first cavity defined by one of the base or the press. The example method also includes aligning an initial component with the first cavity between the base and the press. The initial workpiece is secured to the base such that the mandrel is at least partially disposed in the first cavity. The press and the base are heated. The initial workpiece is pressed into the first cavity using the press such that the mandrel is at least partially disposed in a pocket of the initial workpiece. A finished component is formed. The profile of the finished component is different from the profile of the initial workpiece and the same as a profile of the cavity.

An example biodegradable product includes a component formed of a starch-based cellulosic material having a predetermined profile and at least one pocket disposed therein. The component is dissolvable in water. An insert is disposed at least partially in the pocket. The insert one of a hot melt adhesive and a pre-fabricated insert.

BRIEF DESCRIPTION OF THE DRAWINGS

FIG. 7 is a cross-sectional view of an example tooling system for use with a biodegradable material.

FIG. 8 is a cross sectional view of a portion of the example tooling system of FIG. 8 and a formed biodegradable component using the example tooling system of FIG. 8.

DETAILED DESCRIPTION

Figure 1:
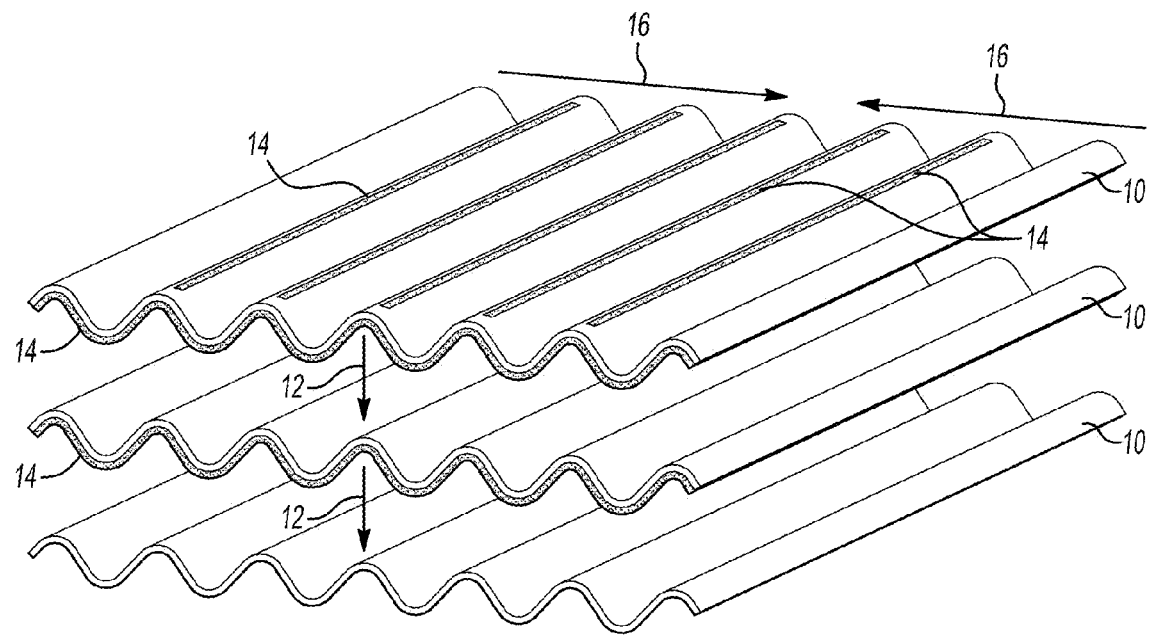
FIG. 1 is a perspective view of example sheets of biodegradable material.

Referring to FIG. 1, a plurality of sheets 10 of a thermoformable, biodegradable material is shown. In one example, the each of the plurality of sheets 10 are formed of a starch-based biodegradable material. In a further example, the starch-based material is dissolvable in water. In another example, the starch-based material is degradable by bacteria. In another example, each of the plurality of sheets 10 are formed of a corn-based cellulosic material ("greencell") or other cellulose based material. However, any biodegradable material may be used. ASTM International defines testing methods for determining whether a material is considered to be biodegradable.

Each of the plurality of sheets 10 are arranged such that they can be stacked to create a workpiece 30 (FIG. 2) of biodegradable material, which can be cut, formed, or otherwise manipulated to be used with tooling, as will be described in further detail below. In this example, each of the plurality of sheets 10 are corrugated. However, it is within the contemplation of this disclosure to use a non-corrugated plurality of sheets, or any combination of corrugated and non-corrugated sheets.

In this example, each of the plurality sheets 10 have a generally rectangular profile. However, other profiles may be used depending on the workpiece 30 and/or component to be formed.

The plurality of sheets 10 is stacked on one another, as shown by arrows 12. Although the plurality of sheets 10 in this example includes three sheets 10, any number of sheets 10 may be used. An adhesive layer 14 is applied to the plurality of sheets 10 to facilitate formation of the workpiece 30 during stacking of the plurality of sheets 10. The adhesive layer 14 may be applied to any of the plurality of sheets 10, or more than one of the plurality of sheets 10. As shown, the adhesive layer 14 is applied between the plurality of sheets 10 to be stacked. Alternatively, or in addition, adhesive layer 14 may be applied on other surfaces of any of the plurality of sheets 10 such that when the sheet 10 is compressed, as shown by arrows 16, the adhesive layer 14 facilitates formation of a compressed, thicker sheet 10. Although these applications of the adhesive layer 14 are shown, it is within the contemplation of this disclosure to use the adhesive layer 14 on any surface of the plurality of sheets 10 to facilitate formation of the workpiece 30.

Figure 2:
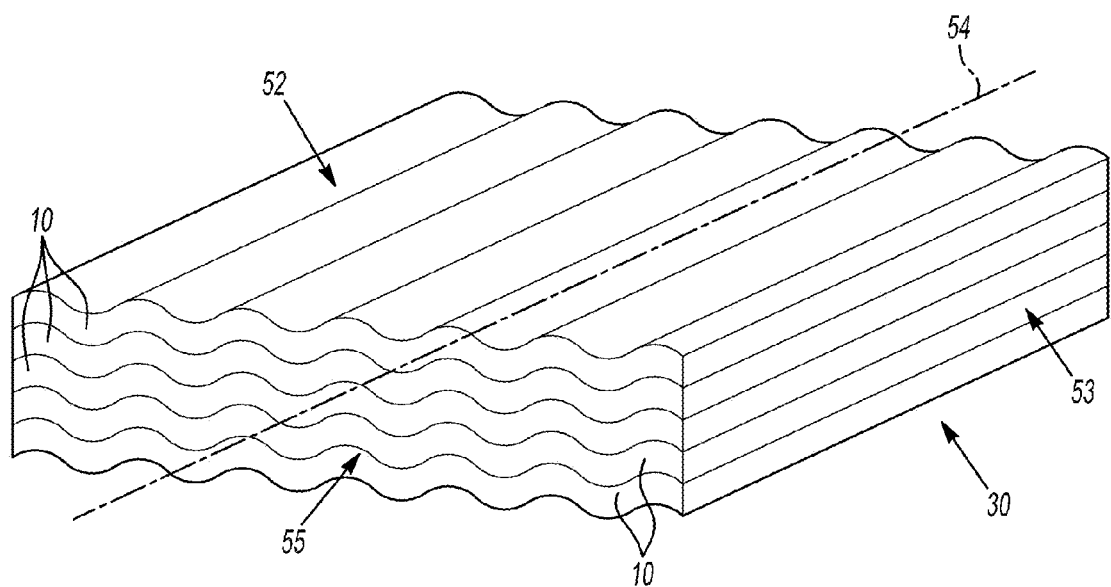
FIG. 2 is a perspective view of an example workpiece of biodegradable material.
Figure 3A:
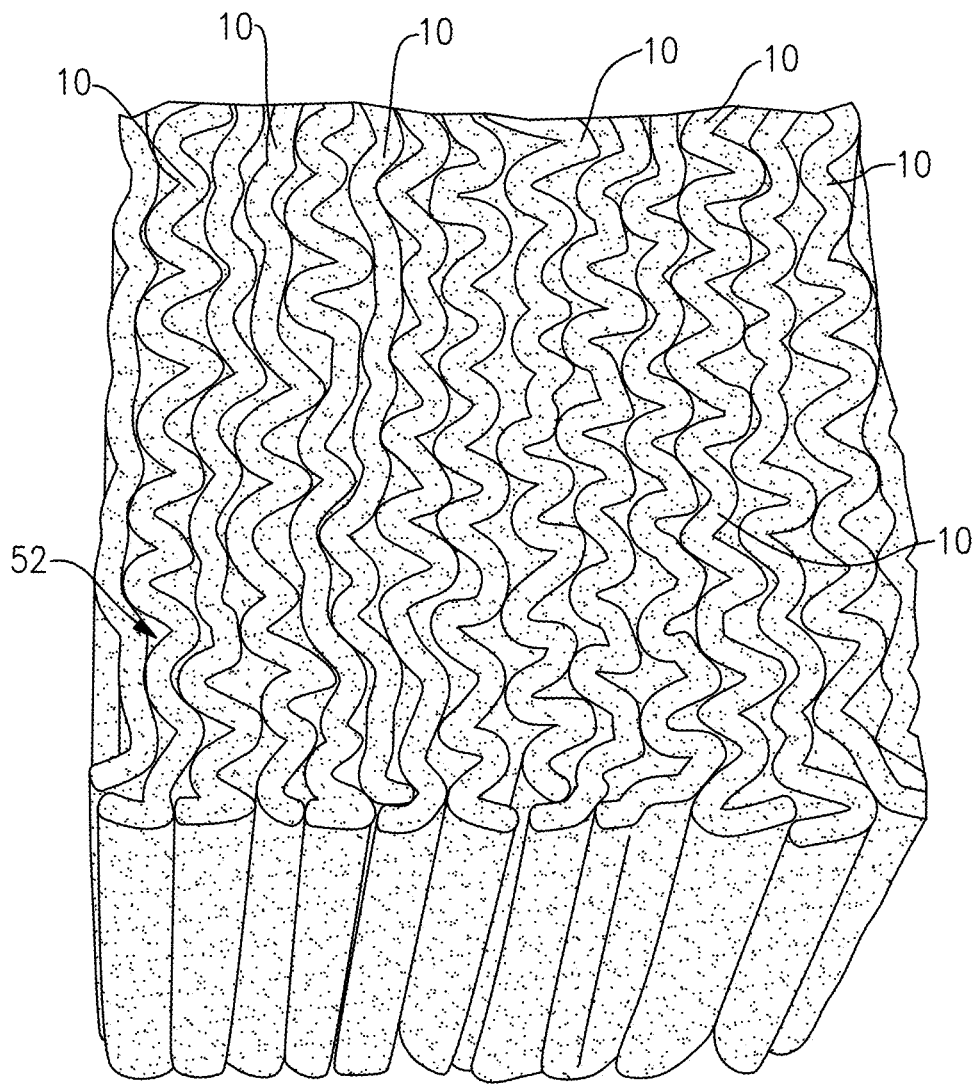
FIGS. 3A and 3B are perspective views of an example initial component of biodegradable material.
Figure 3B:
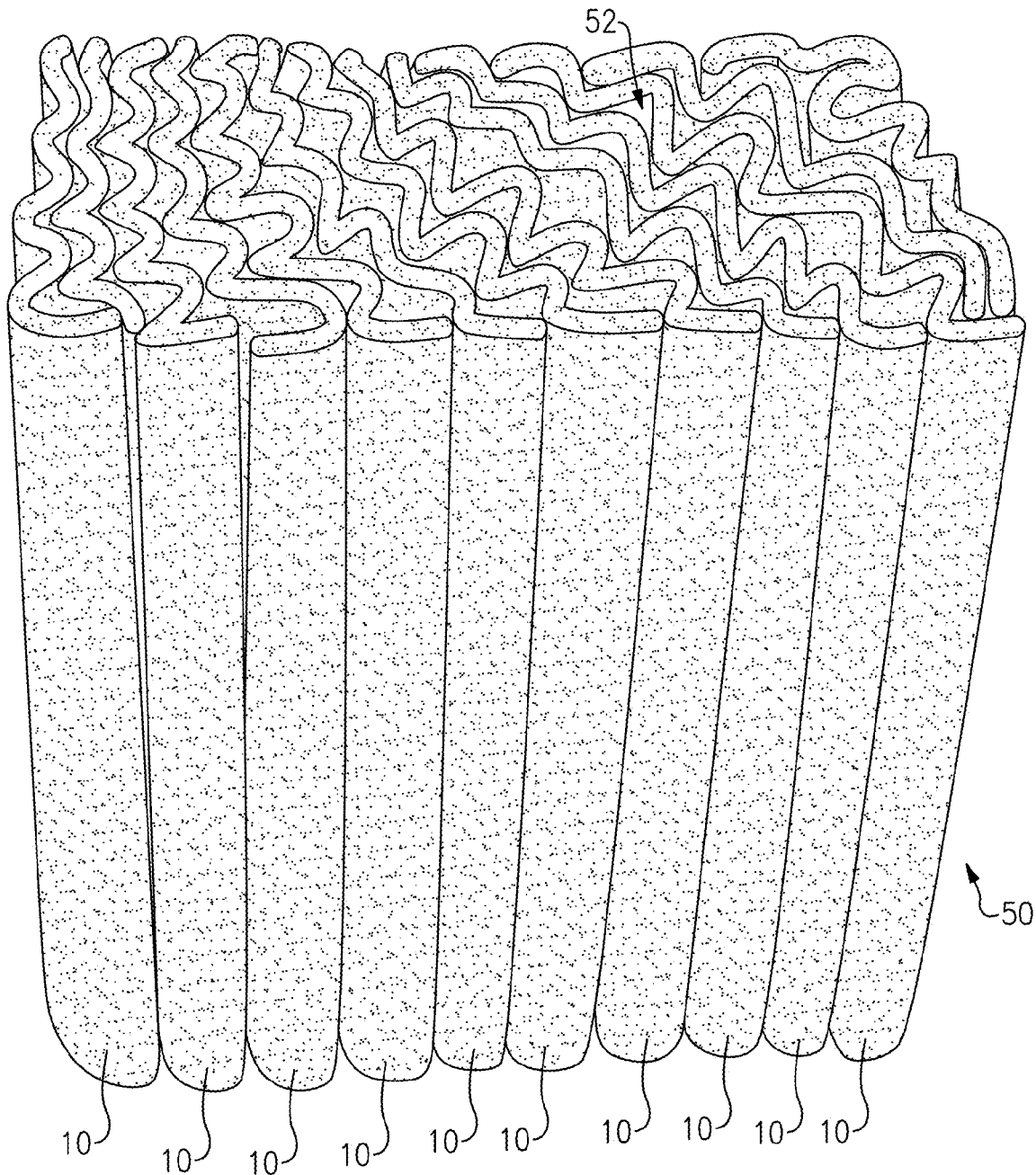

Referring to FIG. 2, an example workpiece 30 is oriented along axis 54. The workpiece 30 includes the plurality of sheets 10. The workpiece 30 can be manipulated to form initial components 50 (FIGS. 3A-3B). The workpiece 30 may be rolled about axis 54 to form a cylinder. The workpiece 30 can also be cut along any surface 52, 53, 55 to form a predetermined two or three dimensional component. Although the example workpiece 30 is generally rectangular, workpieces 30 of any shape or form may be used.

Referring also to FIGS. 3A-3B, example initial components 50 formed from a workpiece 30 have a generally square profile, and include portions of the plurality of sheets 10. In this example, the initial components 50 are a block formed from cutting, or otherwise altering, workpiece 30 along surface 52 and 53 (FIG. 2).

In one example initial components 50 formed from a workpiece 30 have a generally cylindrical profile, and include portions of the plurality of sheets 10. In this example, the initial components 50 are a cylinder formed by rolling workpiece 30 along axis 54 and cutting, or otherwise altering, workpiece 30 along surface 52.

Although FIGS. 3A-3B disclose example initial components 50, initial components 50 of any shape may be formed and used.

Figure 4:
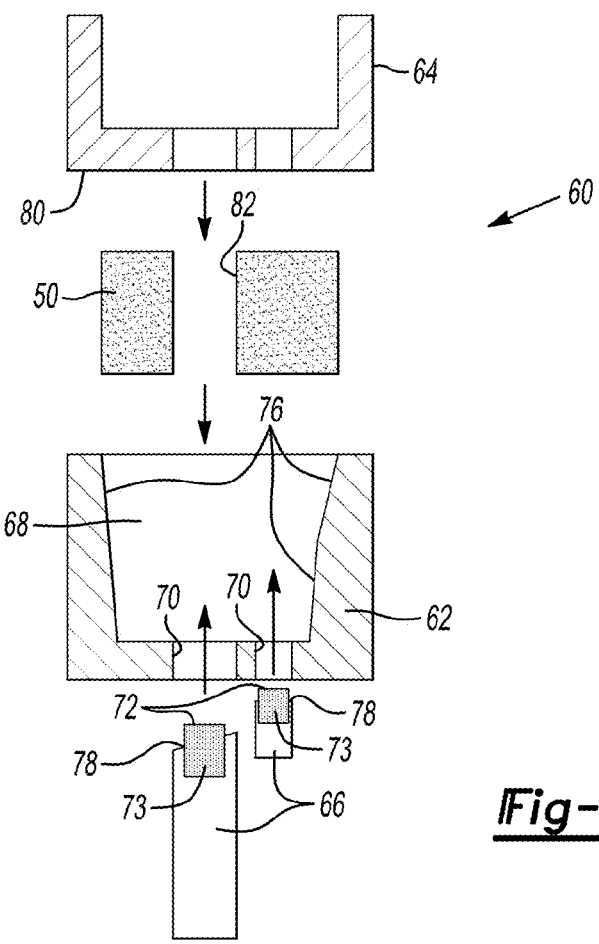
FIG. 4 is a cross-sectional view of an example tooling system for use with a biodegradable material.
Figure 5:
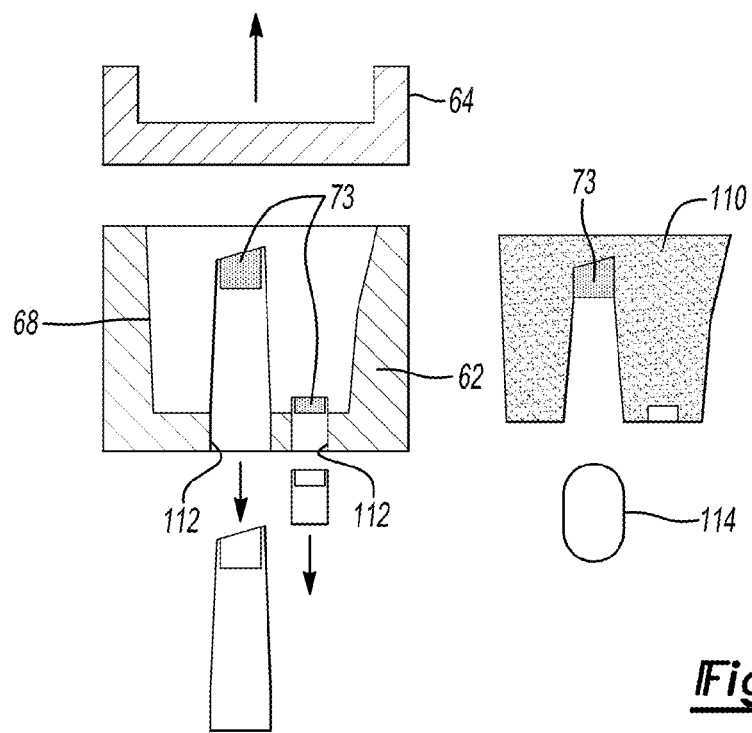
FIG. 5 is a cross-sectional view of a portion of the example tooling system of FIG. 4 and a formed biodegradable component using the example tooling system of FIG. 4.

Referring to FIG. 4, an example tooling system 60 for processing the biodegradable initial components 50 includes a base 62, a press 64, and at least one mandrel 66. Base 62 includes cavity 68 sized to receive the initial component 50. Base 62 further includes at least one opening 70 sized to receive at least one mandrel 66. In this example, two mandrels 66 with two corresponding openings 70 are shown. However, one opening 70 or more than two openings 70 may be used. Alternatively, mandrel 66 can be formed with base 62 as a single component such that mandrel 66 protrudes out from base 62 and is disposed at least partially in cavity 68. Mandrels 66 may be used to form pockets or openings in the initial component 50, depending on desired design and profile of formed component 110 (FIG. 5).

Cavity 68 has a plurality of contoured surfaces 76. However, cavity may be formed in any shape based on the formed profile to be formed from initial component 50.

In one example, at least one mandrel 66 includes a cavity 72 at a first end 78. Cavity 72 is configured to receive an insert 73, such as a hot melt adhesive, a tablet, a slurry to be baked and cured in the forming process, a pre-fabricated insert such as a fastener or electrical clip, or other desired material or component that is to be assembled into the component 50 in the forming process. Alternatively, insert 73 may be disposed over an opening 82 in the initial component 50 for later insertion.

Press 64 includes a pressing surface 80 which contacts initial component 50 during the forming process. In one example, the pressing surface 80 is a flat surface and is disposed parallel to base 62. However, other configurations of pressing surfaces 80 and arrangements relative to base 62 may be used.

In operation, tooling system 60 is used to thermoform the initial component 50 into a pre-determined formed component 110 (FIG. 5). Base 62, having openings 70, as desired, for receiving at least one mandrel 66 is provided. Mandrels 66 are inserted through openings 70 of base 62 such that mandrels 66 are disposed at least partially in cavity 68. Alternatively, base 62 is formed with at least one mandrel 66 and is provided with mandrel 66 extending out from base 62 towards press 64.

If desired, insert 73 is disposed in cavity 72 of any mandrel 66. Alternatively, mandrels 66 can be formed without cavity 72, or be used without disposing insert 73 in cavity 72.

The initial component 50 is provided and disposed over cavity 68 of base 62. In one example, initial component 50 includes a pre-formed opening for receiving at least one mandrel 66 such that mandrel 66 is able to pass through the initial component 50. Alternatively, the at least one mandrel 66 forms pockets in initial component 50 as initial component 50 is formed. Once disposed over cavity 68, the initial component 50 is moved toward base 62 until it is secured such that initial component 50 is ready for forming.

Press 64 is disposed over initial component 50 and moved towards base 62 such that pressing surface 80 of press 64 contacts initial component 50. The pressure from press 64 forces initial component 50 downward into cavity 68. By forcing initial component 50 into cavity 68, initial component 50 is formed to the profile of the cavity 68. Similarly, in one example, initial component 50 is forced onto at least one mandrel 66 such that a pocket is formed in initial component 50 based on the profile of mandrel 66. Press 64 is generally heated to aide in the forming of initial component 50 to the profile of cavity 68.

In one example, press 64 applies pressure and heat to initial component 50 for a time in the range of 5-25 seconds. However, other pressing times may be used.

Referring also to FIG. 5, a formed component 110 is shown. The press 64 and mandrels 66 are removed, leaving initial component 50 in cavity 68 of base 62. Pockets 112 have been formed by mandrels 66. In this example, pockets 112 are generally cylindrical. However, pockets 112 may be formed in any shape, depending on the profile of the mandrels 66. Although shown as pockets 112 extending only partially into initial component 110, it is within the contemplation of this disclosure for pockets 112 to extend entirely through formed component 110.

In one example, at least a portion of insert 73 extends out of cavity 68 at the first end 78 of mandrels 66. As the mandrels 66 are removed from formed component 110, the exposed portion of insert 73 is captured by formed component 110. When the mandrels 66 are removed, formed component 110 expands due to resiliency of the biodegradable material. However, inserts 73 which do not extend out of cavity 72 may be used.

Formed component 110 is then removed from base 62, having been formed as desired. In one example, an additional insert 114 may be placed into pockets 112 as desired. In this example, additional insert 114 has an elliptical profile. However, additional insert 114 with any profile may be used. Additional insert 114 may similarly be disposed in the cavity 72 of mandrels 66.

In one example, formed component 110 is a final component which is not subject to any further processes.

Although an example formed component 110 is shown, formed component 110 may take any shape or profile depending on the components of the tooling system 60.

Referring to FIGS. 6A-6D, an example tooling system 260 includes a cylindrical base 262, a cylindrical mandrel 266, and a press 264. Cylindrical base 262 includes generally frustoconical cavity 268 and an opening 270 sized to allow cylindrical mandrel 266 to pass through opening 270. Cylindrical mandrel 266 is disposed in opening 270 such that cylindrical mandrel 266 extends out from cylindrical base 266 and is disposed at least partially in cavity 268. Cylindrical mandrel 266 has a height 272 greater than the height 274 of cylindrical base 262, but a diameter 276 less than a diameter 278 of cylindrical base. Although a cylindrical mandrel 266 is shown, other shapes of mandrels 266 may be used.

In this example, cylindrical mandrel 266 is rounded at end 280. However, it is within the contemplation of this disclosure for end 280 to include a cavity (not shown) for holding an insert 73 in the example initial component 230 when cylindrical mandrel 266 is removed, as described above.

Figure 6A:
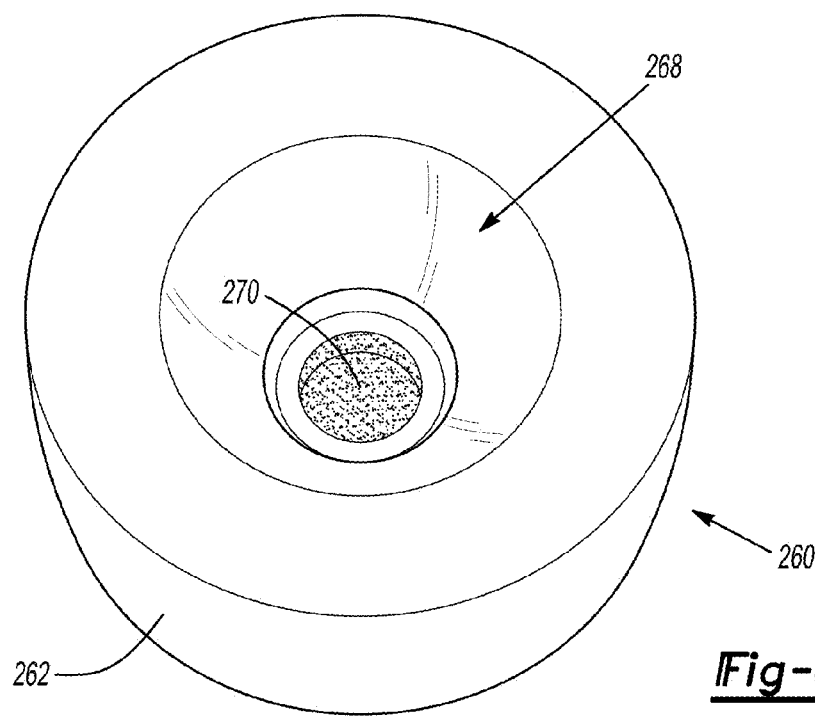
FIGS. 6A-6D are perspective views an example tooling system for use with a biodegradable material.
Figure 6B:
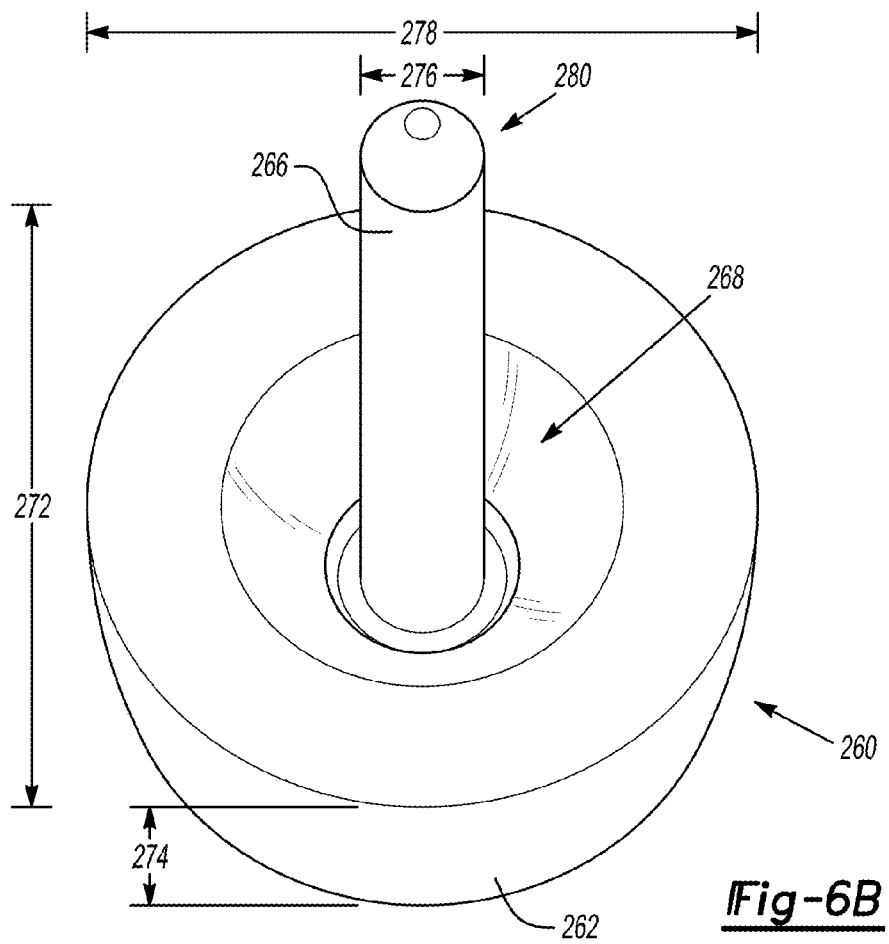
Figure 6C:
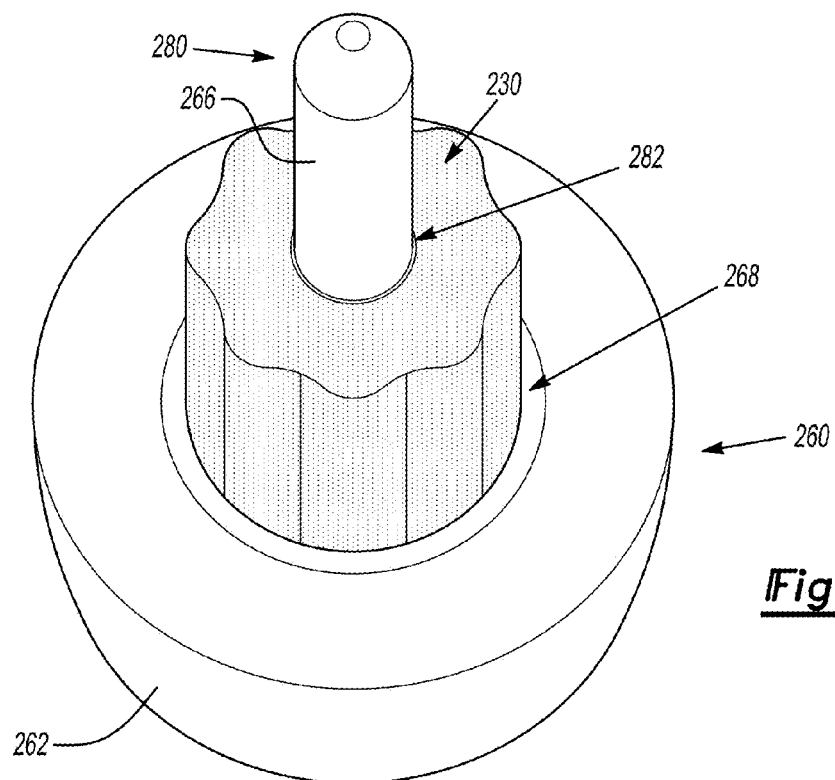

Referring to FIG. 6C, the example initial component 230 has a generally cylindrical profile and an opening 282 sized to receive the cylindrical mandrel 266. Initial component 230 is slid over the cylindrical mandrel 266 such that cylindrical mandrel 266 passes through opening 282 until initial component 230 is disposed in cavity 268.

Figure 6D:
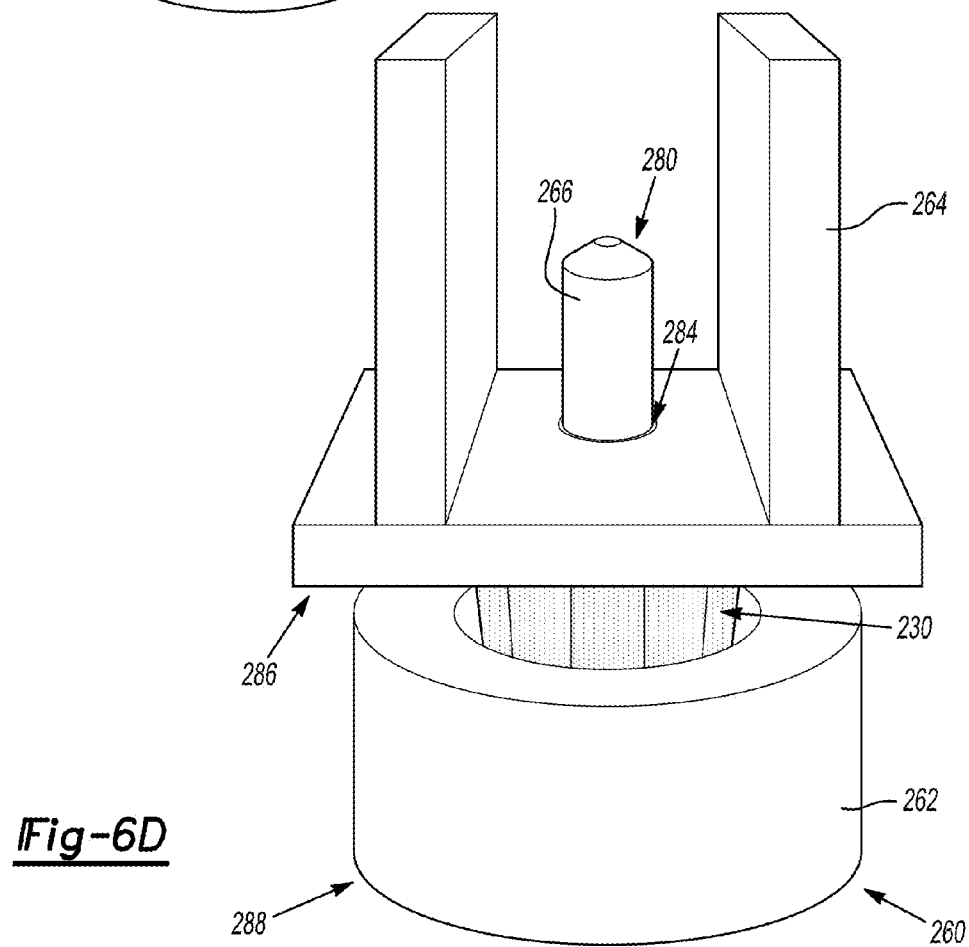

Referring to FIG. 6D, the example press 264 includes an opening 284 sized to receive cylindrical mandrel 266. Press 264 moves towards base 262, until mandrel 266 passes through the opening 284 and at least a portion of a pressing surface 286 contacts initial component 230. In the tooling system 260, the cylindrical base 262 and cylindrical mandrel 266 are pre-heated. The press 264 moves initial component 230 into cavity 268. The heat and pressure form the initial component 230 into the desired shape. After press 264 is removed, cylindrical mandrel 266 is removed either in a first direction though the opening 270 of cylindrical base or in a second direction through opening 282 of initial component 230.

In one example, cylindrical mandrel 266 includes an insert in a cavity (not shown) at end 280 such that when cylindrical mandrel 266 is removed through opening 270 of cylindrical base 262, as described above, initial component 230 retains the insert in opening 282.

Referring to FIG. 7, an example tooling system 310 for forming the biodegradable initial components 50 includes a base 362, a press 364, and at least one mandrel 366. Base 362 includes at least one opening 368 each sized to receive at least one mandrel 366. In this example, two mandrels 366 with two corresponding openings 368 are shown. However, one opening 368 or more than two openings 368 may be used. Alternatively, mandrel 366 can be formed with base 362 as a single component such that mandrel 366 protrudes out from base 362. Mandrels 366 may be used to form pockets or openings in the initial component 50, depending on desired design and profile of formed component.

In one example, base 362 includes legs 363 which raise base 362 a pre-determined distance. Holder 365 is disposed underneath base such that the at least one mandrel 366 contacts holder 365 forcing mandrel 366 to extend through opening 368. Holder 365 is independently removable such that mandrel 366 is lowered away from base 362 and initial component 50 when holder 365 is removed.

In one example, at least one mandrel 366 includes a cavity 372 at a first end 378. Cavity 372 is arranged to receive a material or item 373, such as a hot melt adhesive, a tablet, a slurry to be baked and cured in the forming process, a pre-made insert such as a fastener or electrical clip, or other desired compounds or components. Alternatively, material or item 373 may be disposed in an opening 382 in the initial component 50 after the opening, or pocket, 382 is formed in the initial component 50 (See FIG. 8).

Press 364 includes a cavity 370 with a pressing surface 380 which contacts initial component 50 during the forming process. In one example, the pressing surface 380 includes all contoured surfaces defining cavity 370. However, other pressing surfaces 380 and arrangements may be used.

In operation, tooling system 310 is used to thermoform initial component 50 into a pre-determined formed component 320 (FIG. 8). Base 362, having any necessary openings 368 for receiving at least one mandrel 366 is provided. Mandrels 366 are inserted through openings 368 of base 362 such that mandrels 366 extend out from base 362. Alternatively, base 362 is formed with at least one mandrel 366 such that mandrel 366 extends out from base 362 towards press 364.

If desired, insert 373 may be disposed in cavity 372 of any mandrel 366. Alternatively, mandrels 366 can be formed without cavity 372, or be used without disposing material or item 373 in cavity 372.

The initial component 50 is provided and disposed over base 362 and mandrel 366. In one example, initial component 50 includes a pre-formed opening for receiving at least one mandrel 366 such that mandrel 366 is able to pass through initial component 50. Alternatively, the at least one mandrel 366 forms openings, or pockets, 382 in initial component 50 as initial component 50 is formed. Once disposed over base 362 and mandrel 366, the initial component 50 is moved toward base 362 until it is secured such that initial component 50 is ready for forming.

Press 364 is then disposed over initial component 50 and moved towards base 362 such that pressing surfaces 380 of press 364 contacts initial component 50 and legs 371 of press 364 contact base 362. The pressure from press 364 forces initial component 50 to form to the profile of cavity 370 of press 364. Similarly, in one example, initial component 50 is forced onto at least one mandrel 366 such that a pocket 382 is formed in initial component 50 based on the profile of the at least one mandrel 366. Press 364 is generally heated to aide in the forming of initial component 50 to the profile of cavity 370.

In one example, press 364 applies pressure and heat to initial component 50 for a time in the range of 5-25 seconds. However, other pressing times may be used.

Referring also to FIG. 8, portion of tooling system 310 and a formed component 320 is shown. The mandrels 366 are removed, leaving initial component 50 surrounded by cavity 370 of press 364 and base 362. Pockets 382 have been formed by mandrels 366. Pockets 382 extend either partially into formed component 320 or entirely through formed component 320.

In one example, holder 365 is removed from beneath base 362 such that mandrels 366 fall, leaving initial component 50 with pockets 382. When mandrels 366 fall, insert 373 from cavity 372 of mandrels 366 will be captured by formed component 320. Formed component 320 captures the insert 373 due to resiliency of the biodegradable material, allowing the biodegradable material of formed component 320 to expand as the mandrels 366 are removed.

Press 364 is then removed from formed component 320 and formed component 320 is removed from base 362, having been formed as desired. In one example, additional insert 314 may be placed into pockets 382 as desired. In this example, additional insert 314 has an elliptical profile. However, additional insert 314 with any profile may be used. Additional insert 314 may similarly be disposed in the cavity 372 of mandrels 366.

In one example, formed component 320 is a final component which is not subject to any further processes.

Although an example formed component 320 is shown, formed component 320 may take any shape or profile depending on the components of the tooling system 310.

Figure 9A:
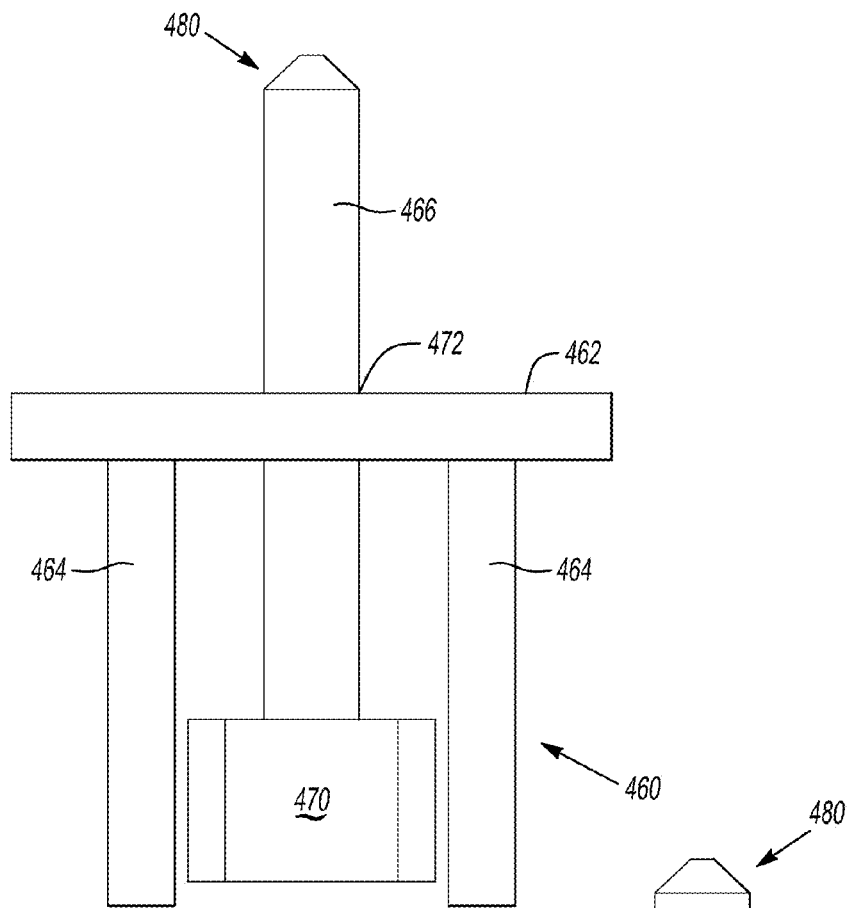
FIGS. 9A-9E are perspective views an example tooling system for use with a biodegradable material.
Figure 9B:
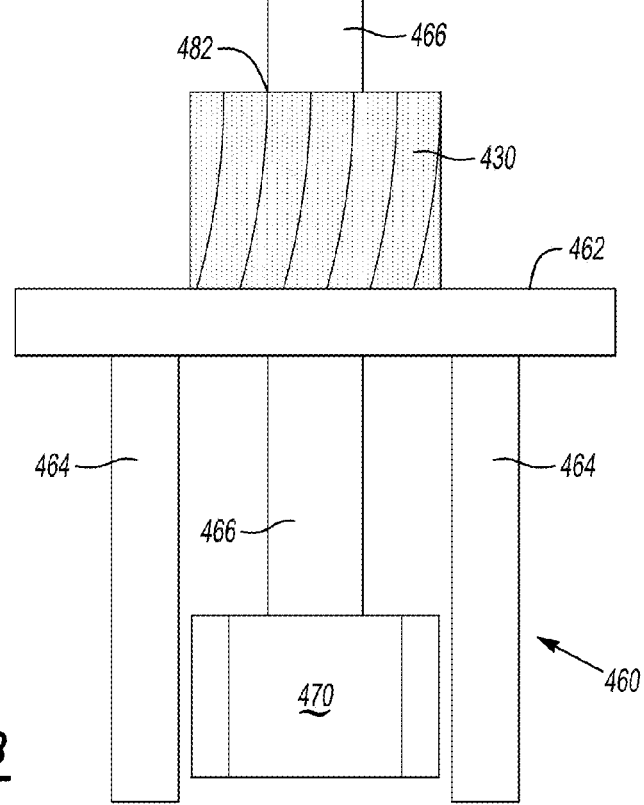
Figure 9C:
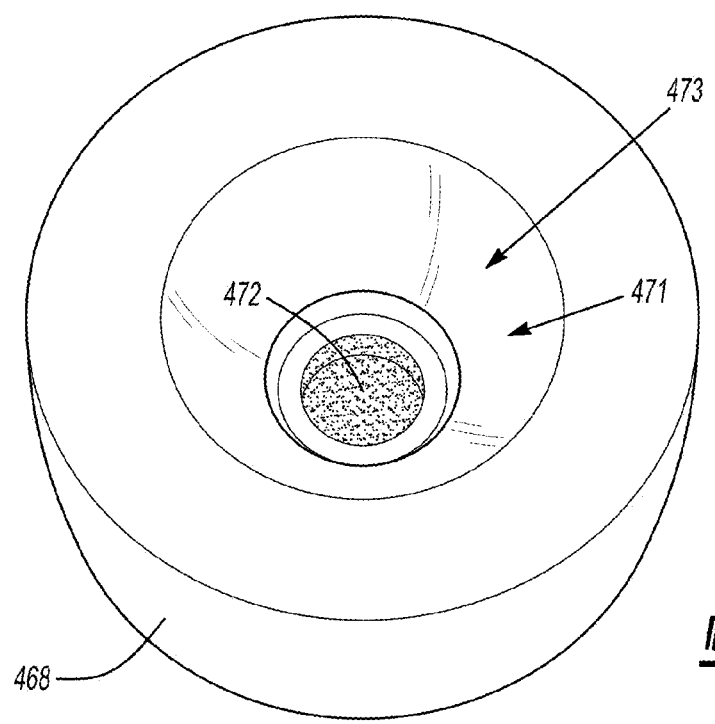

Referring to FIGS. 9A-9C, an example tooling system 460 includes a generally flat base 462 attached to legs 464, a cylindrical mandrel 466, a cylindrical press 468, and a holder 470. Mandrel 466 is contacting holder 470 such that holder 470 supports cylindrical mandrel 466. Cylindrical mandrel 466 extends through an opening 472 of base 462. In this example, holder 470 is between legs 464. However, other arrangements may be used. Similarly, although a cylindrical mandrel 466 is shown, other shapes of mandrels 466 may be used.

In this example, cylindrical mandrel 466 is rounded at end 480. However, it is within the contemplation of this disclosure for end 280 to include a cavity (not shown) for holding insert which will be retained by the example initial component 430 when cylindrical mandrel 466 is removed.

Referring to FIG. 9B, the example initial component 430 has a generally cylindrical profile and an opening 482 sized to receive the cylindrical mandrel 466. Initial component 430 is slid over the cylindrical mandrel 466 such that cylindrical mandrel 466 passes through opening 482 until initial component 430 is disposed on base 462.

Figure 9D:
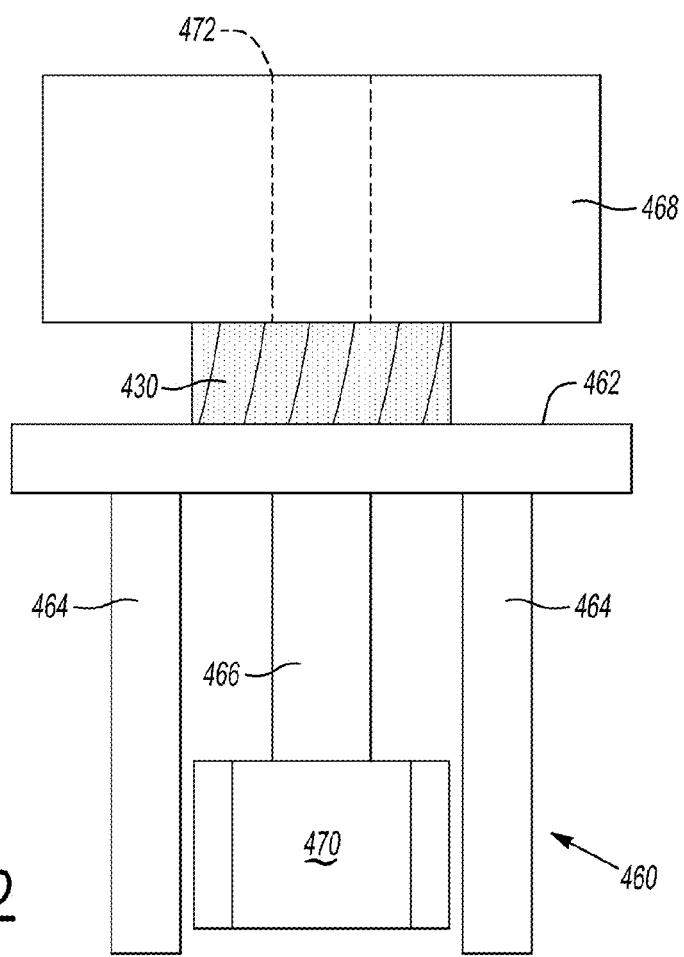

Referring to FIG. 9C-9D, the example press 468 includes a cavity 471 sized to receive initial component 430. In this example, cavity 471 is generally conically shaped and includes surface 473 which contacts initial component 430. Press 468 also includes opening 472 sized to receive cylindrical mandrel 466. Press 468 moves towards base 462, until cylindrical mandrel 466 passes through opening 472 and at least a portion of a surface 473 contacts initial component 430. In tooling system 460, the press 468 and cylindrical mandrel 466 are pre-heated. The press 468 provides pressure on initial component 430 and pushes it against base 462. The heat and pressure form the initial component 430 into the desired shape. After press 468 is removed, the formed component can be removed or lifted from cylindrical base 462.

Press 468 is arranged such that cavity 471 faces initial component 430 and base 462. Press 468 is then aligned with initial component 430 and moved downward for forming.

Figure 9E:
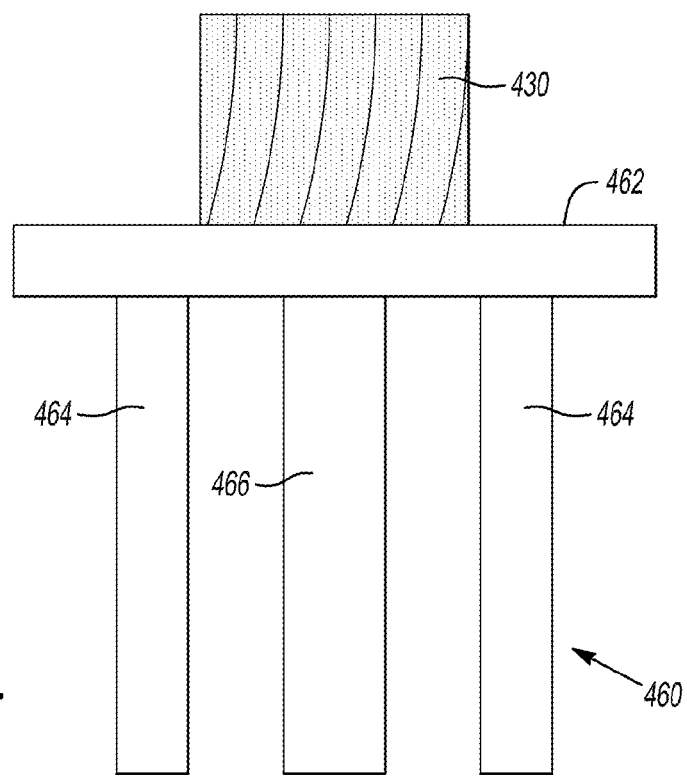

Referring to FIG. 9E after press 268 has been pushed downward for a pre-determined amount of time, holder 470 is removed such that cylindrical mandrel 466 drops downward through opening 482 in initial component 430. This step may be undertaken before or after press 268 is removed.

In one example, cylindrical mandrel 466 includes an insert in a cavity (not shown) at end 480 such that when cylindrical mandrel 266 drops due to removal of holder 470 initial component 430 grasps the insert such that insert is disposed in opening 482. In one example, the insert is an elliptical tablet.

Figure 10:
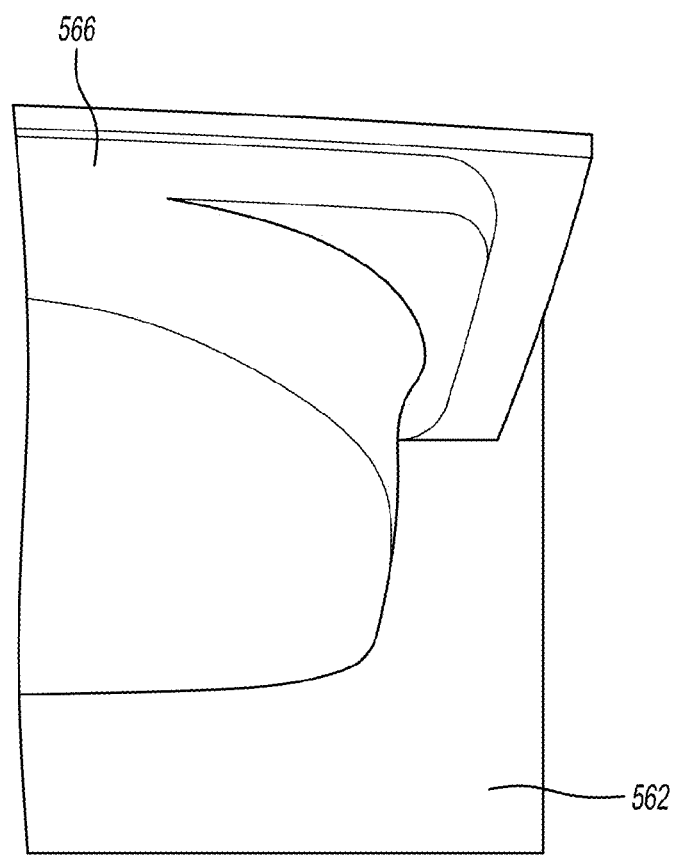
FIG. 10 is a perspective view of an example base and mandrel for use with a biodegradable material.

Referring to FIG. 10, an example base 562 has a mandrel 566 disposed thereon. In this example, the mandrel 566 is formed separately and attached to the base 562. However, the mandrel 566 may alternatively be formed with the base 562. The mandrel 566 extends out from base 562 and has a pre-determined shaped profile. The mandrel 566 may be a machined shaped tool or previously fabricated article of manufacture. During a forming process, an initial component 50 is disposed above the base 562 and mandrel 566 and a press (not shown) is used to force the initial component 50 onto mandrel 566. The forming process using mandrel 566 and base 562 may utilize any of the example tooling systems and processes as described in this disclosure.

Figure 11:
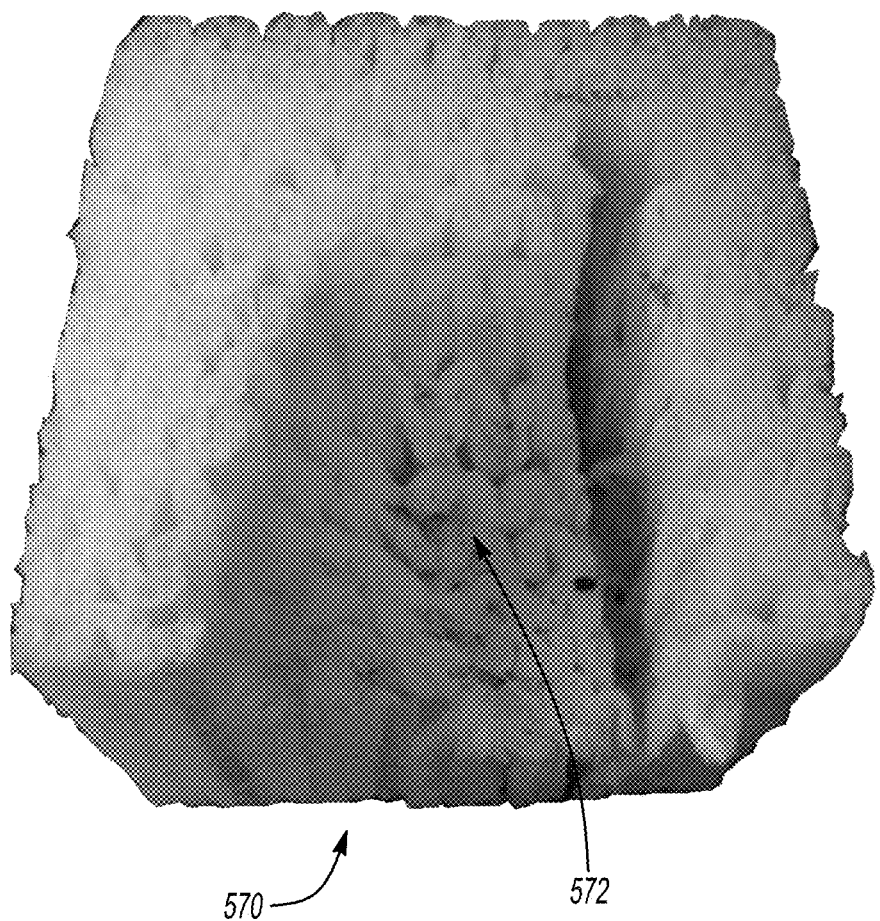
FIG. 11 is a perspective view of an example formed component of biodegradable material using the example base and mandrel of FIG. 10.

Referring to FIG. 11, with continued reference to FIG. 10, as a result of the forming process using mandrel 566, a formed component 570 is created. A pocket 572 in the form of the profile of mandrel 566 is formed in the formed component 570. The profile of mandrel 566 resulting pocket 572 may be formed to any surface or edge of an item of manufacture to be shipped, such that the pocket 572 of formed component 570 may be disposed over the desired surface or edge of the item of manufacture for protection during loading, unloading, and transport. Although an example profile of mandrel 566 is shown, any pre-determined profile may be used.

Although a preferred embodiment of this disclosure has been disclosed, a worker of ordinary skill in this art would recognize that certain modifications would come within the scope of this disclosure. For that reason, the following claims should be studied to determine the true scope and content of this disclosure.

What is claimed is:

1. A method for processing an initial workpiece, the method comprising steps of:
   providing a tooling system comprising a base disposed about an axis, a press axially aligned with the base and defining a pressing surface, and at least one mandrel extending from the base toward the press along the axis, the base or press defining a first cavity having a shape, and at least one of said at least one mandrel including a mandrel cavity receiving an insert;
   aligning the initial workpiece with the first cavity between the base and press;
   securing the aligned workpiece to the base while each mandrel is at least partially disposed in the first cavity;
   heating the press and base;
   pressing the secured workpiece into the first cavity using the heated press so as to form the initial workpiece into the first cavity shape while forming from each mandrel a respective workpiece pocket; and
   removing the mandrel from the shaped workpiece so that each insert remains captured by its respective pocket.

2. The method of claim 1, wherein said pressing is conducted in a range of 5-25 seconds.

3. The method of claim 1, wherein each mandrel cavity is at a mandrel end opposite to the tool base.

4. The method of claim 1, each insert is selected from a hot melt adhesive, a tablet, a slurry to be baked and cured, a pre-fabricated fastener, or a pre-fabricated electrical clip.

5. The method of claim 1, wherein each insert is uncured prior to said pressing.

6. The method of claim 1, wherein each insert extends out of its respective mandrel cavity.

7. The method of claim 1, wherein each insert does not extend out of its respective mandrel cavity.

8. The method of claim 1, further comprising placing an additional insert in at least one of said pockets after said removing.

9. The method of claim 1, wherein each pocket extends partially through the workpiece.

10. The method of claim 1, wherein each pocket extends entirely through the workpiece.

11. The method of claim 1, wherein the initial workpiece comprises a plurality of biodegradable sheets attached to one another by adhesive applied thereto.

12. The method of claim 1, wherein each biodegradable sheet is formed of a starch-based cellulosic material dissolvable in water.

13. The method of claim 1, wherein the workpiece expands during said removing.

* * * * *